United States Patent
Kataoka

(10) Patent No.: US 11,536,358 B2
(45) Date of Patent: Dec. 27, 2022

(54) GEAR DEVICE AND ROBOT

(71) Applicant: Seiko Epson Corporation, Tokyo (JP)

(72) Inventor: Yuya Kataoka, Azumino (JP)

(73) Assignee: SEIKO EPSON CORPORATION

( * ) Notice: Subject to any disclaimer, the term of this patent is extended or adjusted under 35 U.S.C. 154(b) by 47 days.

(21) Appl. No.: 16/953,467

(22) Filed: Nov. 20, 2020

(65) Prior Publication Data
US 2021/0156459 A1    May 27, 2021

(30) Foreign Application Priority Data
Nov. 22, 2019   (JP) .............................. JP2019-211021

(51) Int. Cl.
  *F16H 49/00*   (2006.01)
  *B25J 9/10*    (2006.01)

(52) U.S. Cl.
  CPC ............ *F16H 49/001* (2013.01); *B25J 9/102* (2013.01); *F16H 2049/003* (2013.01)

(58) Field of Classification Search
  CPC .. F16H 49/001; F16H 2049/003; B25J 9/1025
  See application file for complete search history.

(56) References Cited

U.S. PATENT DOCUMENTS

| | | | | |
|---|---|---|---|---|
| 2,906,143 A | * | 9/1959 | Walton | F16H 49/001 74/625 |
| 2002/0178861 A1 | * | 12/2002 | Kobayashi | F16H 49/001 74/640 |
| 2018/0031109 A1 | * | 2/2018 | Kunugi | F16H 49/001 |
| 2018/0085931 A1 | * | 3/2018 | Kataoka | B25J 9/102 |
| 2018/0306276 A1 | * | 10/2018 | Kobayashi | F16H 1/32 |
| 2020/0231229 A1 | * | 7/2020 | Weisbruch | B62D 55/0887 |
| 2021/0316445 A1 | * | 10/2021 | Masai | F16H 55/0833 |
| 2021/0362324 A1 | * | 11/2021 | Masai | F16H 49/001 |

FOREIGN PATENT DOCUMENTS

| | | |
|---|---|---|
| JP | 2002-349681 A | 12/2002 |
| JP | 6494783 B2 | 4/2019 |
| WO | 2017-077657 A1 | 5/2017 |

* cited by examiner

*Primary Examiner* — Terence Boes
(74) *Attorney, Agent, or Firm* — Harness, Dickey & Pierce, P.L.C.

(57) ABSTRACT

A gear device includes an internal gear, a flexible external gear, and a wave generator. The wave generator includes an elliptical cam and a bearing. Grease is applied to the inner circumferential surface of the external gear. A groove is provided along a rotation axis on at least one of the inner circumferential surface of the external gear and an outer circumferential surface of the bearing.

7 Claims, 6 Drawing Sheets

GEAR DEVICE AND ROBOT

The present application is based on, and claims priority from JP Application Serial Number 2019-211021, filed Nov. 22, 2019, the disclosure of which is hereby incorporated by reference herein in its entirety.

BACKGROUND

1. Technical Field

The present disclosure relates to a gear device and a robot including the gear device.

2. Related Art

In a robot, in general, a speed reducer is provided in a driving shaft of a motor in order to drive a joint section of a robot arm. As such a speed reducer, for example, a gear device described in JP-A-2002-349681 is known.

The gear device includes an annular internal gear, a flexible external gear that partially meshes with the internal gear, and a wave generator that comes into contact with the inner circumferential surface of the external gear and moves a meshing position of the internal gear and the external gear in the circumferential direction around a rotation axis. The wave generator includes a cam having an elliptical outer circumferential surface and a bearing disposed between the inner circumferential surface of the external gear and the outer circumferential surface of the cam. The bearing is a deep groove ball bearing in which a plurality of balls are held between an inner ring and an outer ring. A grease reservoir is present on the inner circumferential surface of the external gear. Grease in the grease reservoir flows between the inner circumferential surface of the external gear and the outer circumferential surface of the outer ring of the bearing and between the external gear and the internal gear and functions as a lubricant.

However, the inventor of the present disclosure found that, since the outer ring of the bearing of the wave generator rotates with respect to the external gear according to rotation of the wave generator, it is difficult to retain a sufficient amount of the grease between the inner circumferential surface of the external gear and the outer circumferential surface of the outer ring of the bearing and, as a result, the wave generator less easily smoothly rotates.

SUMMARY

According to a first aspect of the present disclosure, a gear device is provided. The gear device includes: an internal gear; a flexible external gear configured to partially mesh with the internal gear and relatively rotate around a rotation axis with respect to the internal gear; and a wave generator configured to come into contact with an inner circumferential surface of the external gear and move a meshing position of the internal gear and the external gear in a circumferential direction around the rotation axis. The wave generator includes: a cam having an elliptical outer circumferential surface; and a bearing disposed between the inner circumferential surface of the external gear and the outer circumferential surface of the cam. Grease is applied to the inner circumferential surface of the external gear. A groove is provided along the rotation axis on at least one of the inner circumferential surface of the external gear and an outer circumferential surface of the bearing.

According to a second aspect of the present disclosure, a robot is provided. The robot includes: a first member configuring a base or an arm; a second member configuring an arm turnably provided with respect to the first member; and a gear device configured to transmit a driving force from one side to another side of the first member and the second member. The gear device includes: an internal gear; a flexible external gear configured to partially mesh with the internal gear and relatively rotate around a rotation axis with respect to the internal gear; and a wave generator configured to come into contact with an inner circumferential surface of the external gear and move a meshing position of the internal gear and the external gear in a circumferential direction around the rotation axis. The wave generator includes: a cam having an elliptical outer circumferential surface; and a bearing disposed between the inner circumferential surface of the external gear and the outer circumferential surface of the cam. Grease is applied to the inner circumferential surface of the external gear. A groove is provided along the rotation axis on at least one of the inner circumferential surface of the external gear and an outer circumferential surface of the bearing.

DESCRIPTION OF EXEMPLARY EMBODIMENTS

Figure 1:
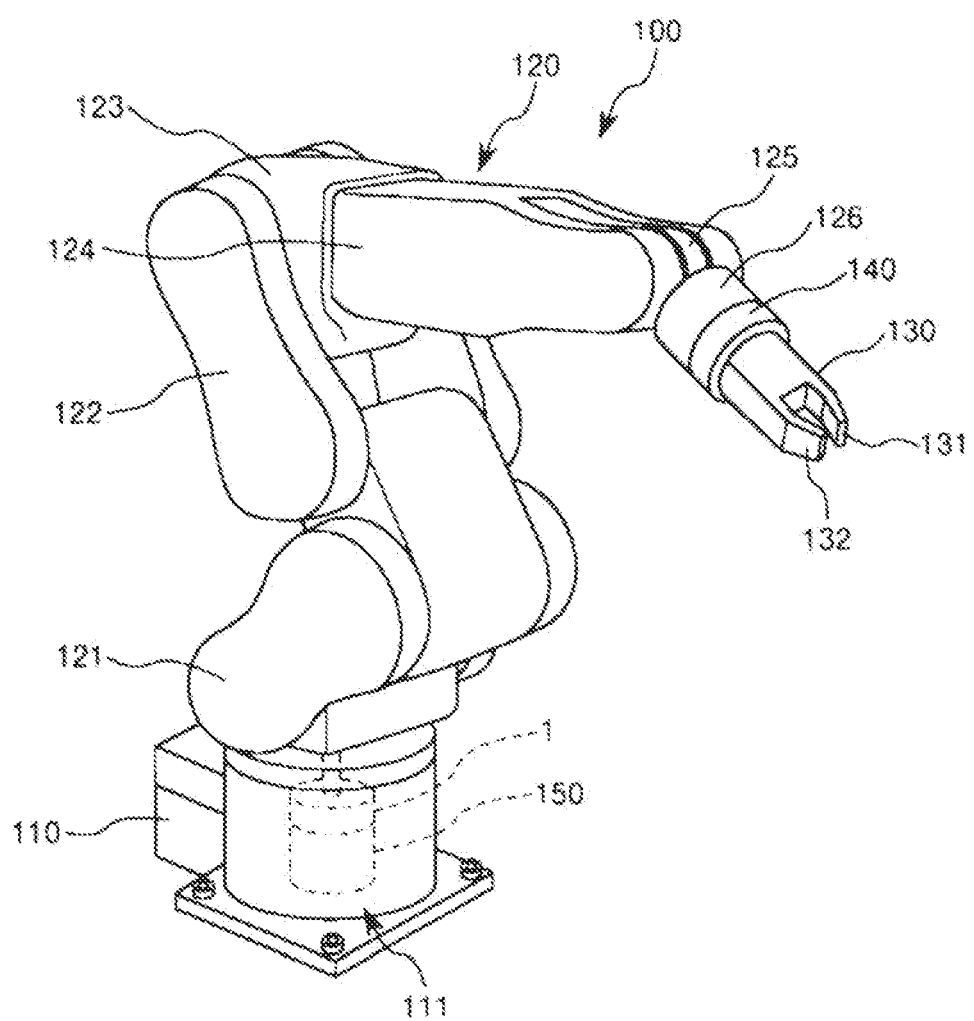
FIG. 1 is a diagram showing a schematic configuration of a robot according to an embodiment of the present disclosure.

FIG. 1 is a diagram showing a schematic configuration of a robot according to an embodiment of the present disclosure. A robot 100 shown in FIG. 1 is a six-axis vertical articulated robot. The robot 100 can perform work such as supply, removal, conveyance, and assembly of a precision instrument and components configuring the precision instrument.

The robot 100 includes a base 111, a robot arm 120 connected to the base 111, and a force detector 140 and a hand 130 provided at the distal end portion of the robot arm 120. The robot 100 includes a control device 110 that controls a plurality of driving sources that generate power for driving the robot arm 120. The driving source includes a motor 150 and a gear device 1.

The base 111 is a portion for attaching the robot 100 to any setting part. A setting part of the base 111 is not particularly limited. Examples of the setting part include a floor, a wall, a ceiling, and a movable truck.

The robot arm 120 includes a first arm 121, a second arm 122, a third arm 123, a fourth arm 124, a fifth arm 125, and a sixth arm 126. These arms are coupled in this order from the proximal end side toward the distal end side of the robot arm 120. The first arm 121 is connected to the base 111. An end effector such as the hand 130, which grips various components and the like, is detachably attached to the distal end of the sixth arm 126. The hand 130 includes two fingers 131 and 132 and can grip the various components and the like with the fingers 131 and 132.

In the base 111, a driving source including the motor 150 such as a servomotor, which drives the first arm 121, and the gear device 1 functioning as a speed reducer is provided. Although not illustrated, a plurality of driving sources including motors and speed reducers are also respectively provided in the arms 121 to 126. The driving sources are controlled by the control device 110.

In such a robot 100, the gear device 1 transmits a driving force from one side to the other side of the base 111 functioning as the first member and the first arm 121 functioning as the second member. More specifically, the gear device 1 transmits, from the base 111 side to the first arm 121 side, a driving force for turning the first arm 121 with respect to the base 111. Since the gear device 1 functions as the speed reducer, it is possible to decelerate rotation by the driving force from the motor 150 and turn the first arm 121 with respect to the base 111. Note that "turn" includes moving in both directions including one direction and the opposite direction of the one direction with respect to a certain center point and rotating with respect to the certain center point.

In this way, the robot 100 includes the base 111, which is the first member configuring a base, the first arm 121, which is the second member configuring an arm turnably provided with respect to the base 111, and the gear device 1 that transmits the driving force from one side to the other side of the base 111 and the first arm 121.

Any number of arms sequentially selected from the first arm 121 side among the second arm 122 to the sixth arm 126 may be grasped as the "second member". That is, a structure formed by the first arm 121 and any number of arms sequentially selected from the first arm 121 side among the second arm 122 to the sixth arm 126 is also considered to be the "second member". For example, a structure formed by the first arm 121 and the second arm 122 is also considered to be the "second member" or the entire robot arm 120 is also considered to be the "second member". The "second member" may include the hand 130. That is, a structure formed by the robot arm 120 and the hand 130 is also considered to be the "second member".

The robot 100 explained above includes the gear device 1 explained below. In the following explanation, the gear device 1 is explained as an example of the gear device according to the present disclosure.

Figure 2:
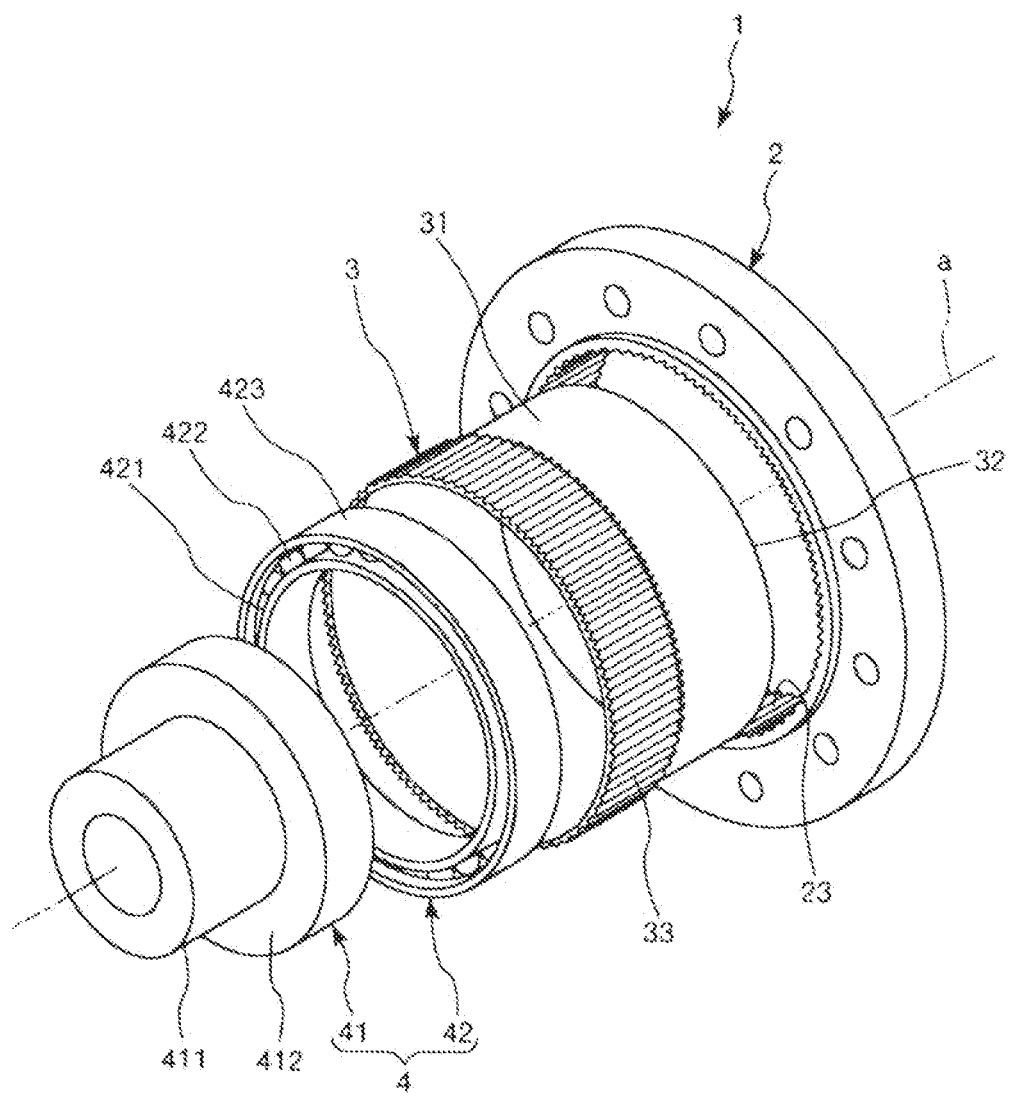
FIG. 2 is an exploded perspective view showing a gear device according to the embodiment of the present disclosure.
Figure 3:
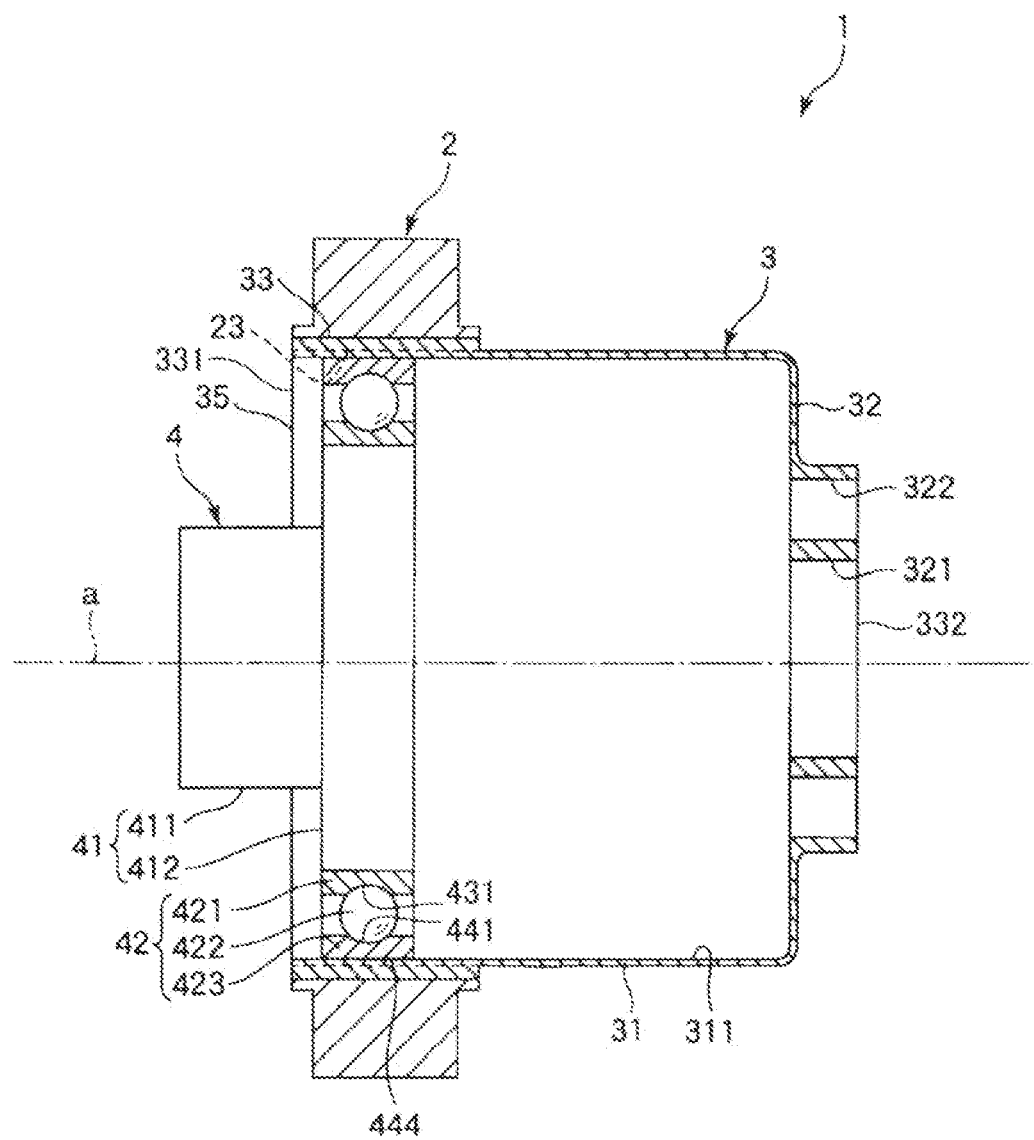
FIG. 3 is a longitudinal sectional view of the gear device shown in FIG. 2.
Figure 4:
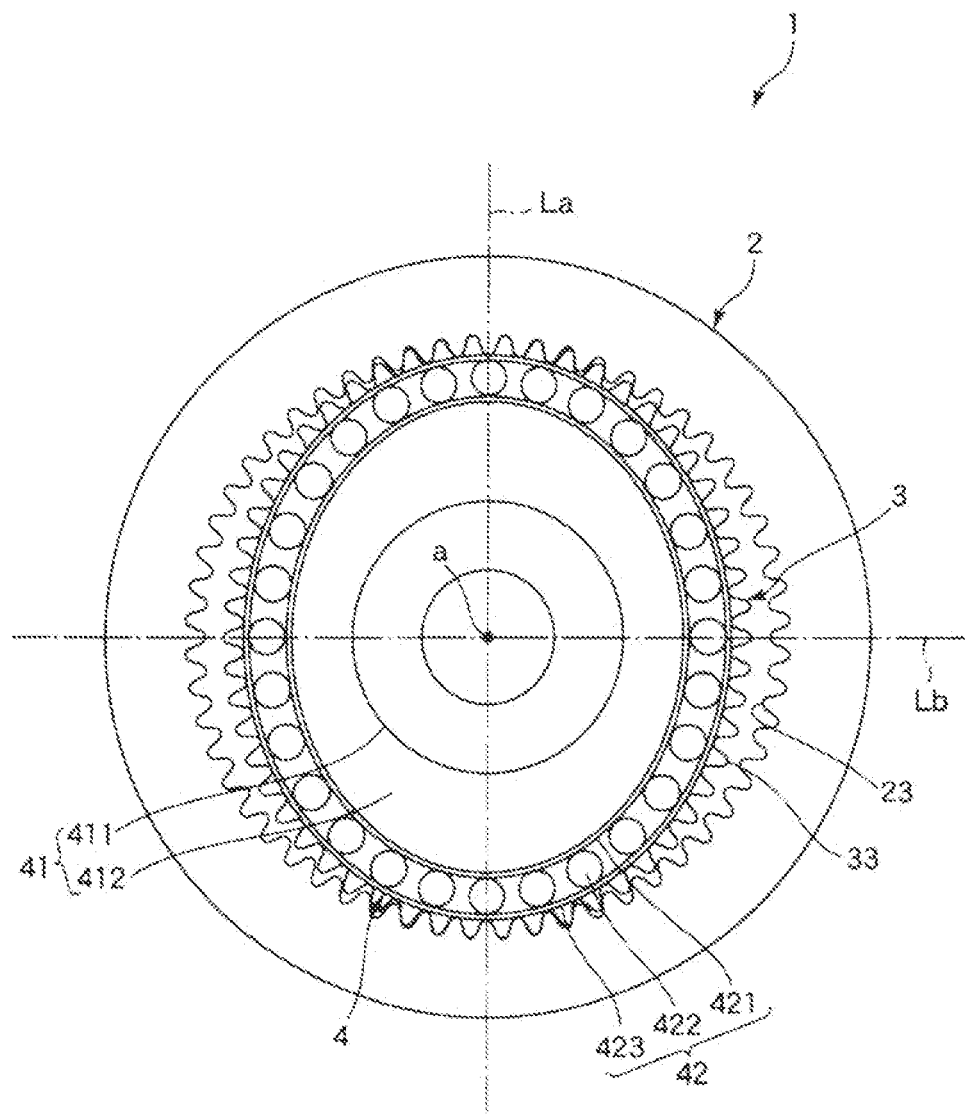
FIG. 4 is a front view of the gear device shown in FIG. 2.

FIG. 2 is an exploded perspective view showing a gear device according to the embodiment of the present disclosure. FIG. 3 is a longitudinal sectional view of the gear device shown in FIG. 2. FIG. 4 is a front view of the gear device shown in FIG. 2. In the figure, for convenience of explanation, dimensions of sections are exaggerated and illustrated as appropriate according to necessity. Dimension ratios among the sections do not always coincide with actual dimension ratios.

The gear device 1 shown in FIGS. 2 to 4 is a wave gear device and is used as, for example, a speed reducer. The gear device 1 includes a rigid internal gear 2, a flexible external gear 3 that partially meshes with the internal gear 2 and relatively rotates around a rotation axis "a" with respect to the internal gear 2, and a wave generator 4 that comes into contact with the inner circumferential surface of the external gear 3 and moves a meshing position of the internal gear 2 and the external gear 3 in a circumferential direction around the rotation axis "a". Although not illustrated, a lubricant such as grease is disposed as appropriate according to necessity in a sliding portion and a contact portion in the gear device 1. For example, the grease is applied to an inner circumferential surface 311 of the external gear 3 and functions as a grease reservoir.

In this embodiment, the internal gear 2 is fixed to the base 111, which is the first member of the robot 100 explained above. The external gear 3 is connected to the first arm 121, which is the first member of the robot 100 explained above. The wave generator 4 is connected to a rotating shaft of the motor 150 of the robot 100 explained above.

When the rotating shaft of the motor 150 rotates, the wave generator 4 rotates at the same rotating speed as the rotating speed of the motor 150. Since the number of teeth of the internal gear 2 and the number of teeth of the external gear 3 are different from each other, a meshing position of the internal gear 2 and the external gear 3 moves in the circumferential direction and, at the same time, the internal gear 2 and the external gear 3 relatively rotate around the axis "a" because of the differences between the numbers of teeth. The axis "a" is called "rotation axis "a"" as well. In this embodiment, since the number of teeth of the internal gear 2 is larger than the number of teeth of the external gear 3, the external gear 3 can be rotated at rotating speed lower than the rotating speed of the motor 150. That is, it is possible to realize a speed reducer including the wave generator 4 on an input shaft side and the external gear 3 on an output shaft side.

A connection form of the internal gear 2, the external gear 3, and the wave generator 4 is not limited to the form explained above. For example, even when the external gear 3 is fixed to the base 111 and the internal gear 2 is connected to the first arm 121, the gear device 1 can be used as the speed reducer. Even when the external gear 3 is connected to the rotating shaft of the motor 150, the gear device 1 can be used as the speed reducer. In this case, all that has to be done is to fix the wave generator 4 to the base 111 and connect the internal gear 2 to the first arm 121. When the gear device 1 is used as a speed increaser, the relation between the motor 150 side, which is the input side, and the first arm 121 side, which is the output side, only has to be reversed.

The configuration of the gear device 1 is briefly explained. As shown in FIGS. 2 to 4, the internal gear 2 is a gear configured by a rigid body that does not substantially bends in the radial direction and is a ring-like gear including internal teeth 23. In this embodiment, the internal gear 2 is a spur gear. That is, the internal teeth 23 have tooth traces parallel to the axis "a". The tooth traces of the internal teeth 23 may be inclined with respect to the axis "a". That is, the internal gear 2 may be a helical gear or a double-helical gear.

The external gear 3 is inserted through the inner side of the internal gear 2. The external gear 3 is a flexible gear deflectively deformable in the radial direction and is an external gear including external teeth 33 that mesh with the internal teeth 23 of the internal gear 2. The number of teeth of the external gear 3 is smaller than the number of teeth of the internal gear 2. Since the number of teeth of the external gear 3 and the number of teeth of the internal gear 2 are different from each other, a speed reducer can be realized.

In this embodiment, the external gear 3 is formed in a cup shape including an opening 35 at the left end in the axis "a" direction in FIG. 3. The external teeth 33 are formed on the outer circumferential surface of the external gear 3. The external gear 3 includes a cylindrical body section 31 around the axis "a" and a bottom section 32 connected to one end portion side in the axis "a" direction of the body section 31, that is, the right side in the axis "a" direction in FIG. 3.

As shown in FIG. 3, the bottom section 32 of the external gear 3, a hole 321 piercing through the bottom section 32 along the axis "a" and a plurality of holes 322 piercing through the bottom section 32 around the hole 321 are formed. The hole 321 can pierce through a not-shown shaft body on the output side. The holes 322 can be used as screw holes through which screws for fixing a shaft body on the output side to the bottom section 32 are inserted. These holes only have to be provided as appropriate and can also be omitted.

As shown in FIGS. 3 and 4, the wave generator 4 is disposed on the inner side of the external gear 3 and rotatable around the axis "a". The wave generator 4 deforms the lateral cross section of the body section 31 of external gear 3 into an elliptical shape or an oval shape having a major axis La and a minor axis Lb and meshes the external teeth 33 with the internal teeth 23 of the internal gear 2. The external gear 3 and the internal gear 2 are meshed with each other on the inside and the outside to be rotatable around the same axis "a".

The external gear 3 includes two end portions 331 and 332 in a direction along the axis "a". Of the two end portions 331 and 332, the end portion 331 on the opening 35 side is referred to as "first end portion 331" and the end portion 332 at the opposite side of the first end portion 331 is referred to as "second end portion 332". The body section 31 near the first end portion 331 is a portion where large deformation due to coning occurs. The coning means three-dimensional deformation in which the body section 31 expands to the outer side with respect to the axis "a" on the major axis La side shown in FIG. 4 and the body section 31 narrows to the inner side with respect to the axis "a" on the minor axis Lb side.

The wave generator 4 includes a cam 41 and a bearing 42 attached to the outer circumference of the cam 41. The cam 41 includes a shaft section 411 that rotates around the axis "a" and a cam section 412 that projects to the outer side from one end portion of the shaft section 411. When viewed from the direction along the axis "a", the outer circumferential surface of the cam section 412 is formed in an elliptical shape or an oval shape having the up-down direction in FIGS. 3 and 4 as the major axis La. The bearing 42 includes a flexible inner ring 421 and a flexible outer ring 423 and a plurality of balls 422 disposed between the inner ring 421 and the outer ring 423.

The inner ring 421 is fit in the outer circumferential surface of the cam section 412 of the cam 41 and is elastically deformed into an elliptical shape or an oval shape along the outer circumferential surface of the cam section 412. According to the elastic deformation of the inner ring 421, the outer ring 423 is also elastically deformed into an elliptical shape or an oval shape. An outer circumferential surface 444 of the outer ring 423 is in contact with the inner circumferential surface 311 of the body section 31. The outer circumferential surface of the inner ring 421 and the inner circumferential surface of the outer ring 423 respectively form track surfaces 431 and 441 for rolling the plurality of balls 422 while guiding the plurality of balls 422 along the circumferential direction. The cross sections of the track surfaces 431 and 441 are formed in an arc having a radius slightly larger than the radius of the balls 422. The plurality of balls 422 are held by a not-shown holder to keep intervals in the circumferential direction among the plurality of balls 422 constant.

In such a wave generator 4, the direction of the cam section 412 changes according to the rotation of the cam 41 around the axis "a". According to the change of the direction of the cam section 412, the outer ring 423 is also deformed to move the meshing position of the internal gear 2 and the external gear 3 in the circumferential direction. At this time, since the inner ring 421 is fixedly set with respect to the outer circumferential surface of the cam section 412, a deformed state of the inner ring 421 does not change.

Figure 5:
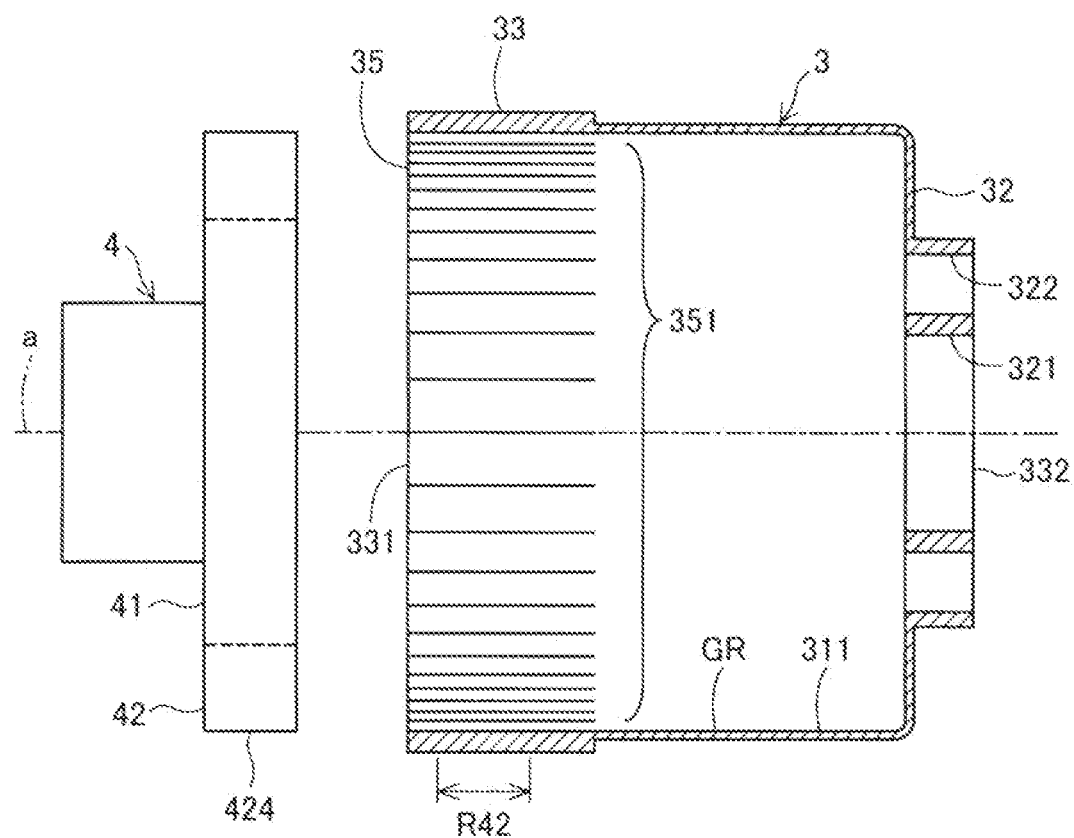
FIG. 5 is an explanatory diagram showing an example of groove formation on the inner circumferential surface of an external gear and the outer circumferential surface of a bearing.

FIG. 5 is an explanatory diagram showing an example of groove formation on the inner circumferential surface 311 of the external gear 3 and an outer circumferential surface 424 of the bearing 42 of the wave generator 4. About the external gear 3, a partial section taken along a cut surface passing the axis "a" is drawn. On the other hand, about the wave generator 4, an exterior is drawn rather than a section. As explained above, grease GR is applied to the inner circumferential surface 311 of the external gear 3.

In this example, a plurality of grooves 351 along the rotation axis "a" are provided on the inner circumferential surface 311 of the external gear 3. These grooves 351 are referred to as "first grooves 351" as well. The word "grooves 351 along the rotation axis "a"" means that, when a line segment parallel to the rotation axis "a" is drawn on the inner circumferential surface 311, an angle formed by the line segment and the grooves 351 is 30 degrees or less. By providing the grooves 351, it is possible to easily retain the grease GR between the inner circumferential surface 311 of the external gear 3 and the outer circumferential surface 424 of the bearing 42. The grooves 351 also have a function of guiding the grease GR to between the external gear 3 and the internal gear 2. For this function, the angle formed by the grooves 351 and the rotation axis "a" is preferably set to 5 degrees or less. In particular, the grooves 351 and the rotation axis "a" are preferably parallel. The plurality of grooves 351 are preferably provided. Further, the plurality of grooves 351 preferably extend in parallel to one another.

In the example shown in FIG. 5, the grooves 351 extend from the one end portion 331 to the second end portion 332 of the external gear 3. The grooves 351 are preferably provided across a portion R42, which is in contact with the bearing 42 of the wave generator 4, on the inner circumferential surface 311 of the external gear 3. With this configuration, since the grooves 351 are provided across the portion R42, which is in contact with the bearing 42 of the wave generator 4, on the inner circumferential surface 311 of the external gear 3, it is possible to easily retain the grease GR between the external gear 3 and the bearing 42 of the wave generator 4. Since the grooves 351 extend from the first end portion 331 on the opening 35 side toward the second end portion 332 of the external gear 3, it is possible to easily guide the grease GR to between the external gear 3 and the internal gear 2 via the first end portion 331. In the example shown in FIG. 5, starting from the first end portion 331, the grooves 351 are formed across a portion equivalent to the entire range of the external teeth 33 of the external gear 3. Consequently, it is possible to easily retain a sufficient amount of the grease GR between the external gear 3 and the bearing 42 of the wave generator 4. Even if the portion R42 moves in the direction along the rotation axis "a", it is possible to easily retain the grease GR between the inner circumferential surface 311 of the external gear 3 and the outer circumferential surface 424 of the bearing 42.

The width and the depth of the grooves 351 are preferably set to appropriate sizes corresponding to the size of a solid additive agent included in the grease GR. For example, when the size of the solid additive agent is 10 μm or less, the width of the grooves 351 is preferably set to at least 10 μm. The depth of the grooves 351 is preferably set smaller than the width of the grooves 351, for example, set to a half of the width. This is because retention of the grease GR can be improved by setting the depth of the grooves 351 to depth at which the solid additive agent is in contact with both of the external gear 3 and the bearing 42 of the wave generator 4. Since it is conceivable that pressure is desired to be applied to the solid additive agent by the external gear 3 and the bearing 42 of the wave generator 4, the depth of the grooves 351 is preferably set smaller than the width of the grooves 351. As the grease GR, for example, grease containing organic molybdenum as the solid additive agent and including a lithium soap group as a thickening agent can be used. When the depth of the grooves 351 is excessively small, a function of retaining the grease GR cannot be exerted. Therefore, irrespective of the size of the solid additive agent, the depth of the grooves 351 is preferably set to 5 μm or more and more preferably set to 10 μm or more.

The grooves 351 can be formed by, for example, honing. That is, by reciprocating a grindstone of a honing machine in the direction along the rotation axis "a", it is possible to form the plurality of grooves 351 along the rotation axis "a" on the inner circumferential surface 311 of the external gear 3.

In the example shown in FIG. 5, the grooves 351 are formed on the inner circumferential surface 311 of the external gear 3. Instead, the grooves 351 may be formed on the outer circumferential surface 424 of the bearing 42. The grooves 351 may be provided on both of the inner circumferential surface 311 of the external gear 3 and the outer circumferential surface 424 of the baring 42. In other words, the grooves 351 are preferably provided along the rotation axis "a" on at least one of the inner circumferential surface 311 of the external gear 3 and the outer circumferential surface 424 of the bearing 42.

Figure 6:
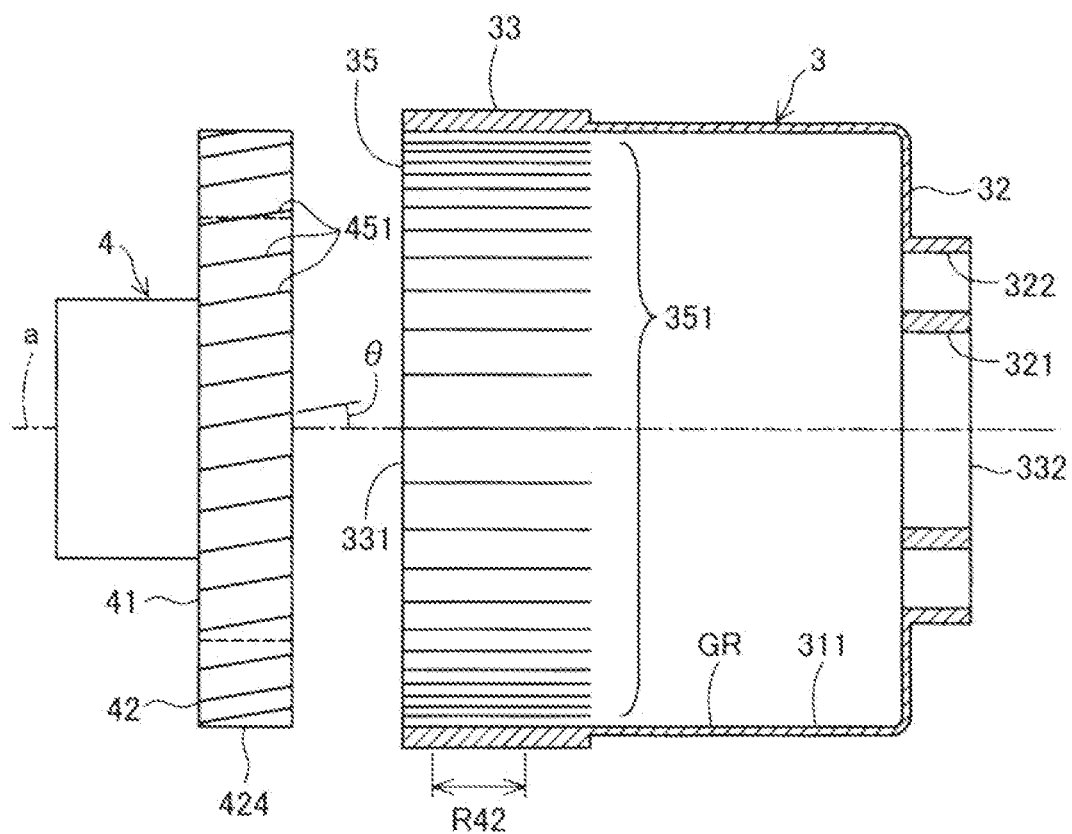
FIG. 6 is an explanatory diagram showing another example of the groove formation on the inner circumferential surface of the external gear and the outer circumferential surface of the bearing.

FIG. 6 is an explanatory diagram showing another example of the groove formation on the inner circumferential surface 311 of the external gear 3 and the outer circumferential surface 424 of the bearing 42 of the wave generator 4. In this example, in addition to the grooves 351 provided on the inner circumferential surface 311 of the external gear 3, other grooves 451 are provided on the outer circumferential surface 424 of the bearing 42. A plurality of grooves 451 are provided across both ends of the outer circumferential surface 424 of the bearing 42 along the rotation axis "a". These grooves 451 are referred to as "second grooves 451" or "other grooves 451" as well. Preferred values concerning the direction, the depth, and the width of the second grooves 451 are the same as the values of the first grooves 351 explained above. The second grooves 451 preferably cross the first grooves 351. This is because, when the first grooves 351 and the second grooves 451 are parallel, the first grooves 351 and the second grooves 451 are likely to be rotational resistance. An angle θ formed by the first grooves 351 and the second grooves 451 is preferably 10 degrees or less and more preferably 5 degrees or less.

The second grooves 451 may be formed on the same surface as the surface on which the first grooves 351 are formed. Specifically, when the first grooves 351 are formed on the inner circumferential surface 311 of the external gear 3, the second grooves 451 may be formed on the inner circumferential surface 311 of the external gear 3. When the first grooves 351 are formed on the outer circumferential surface 424 of the bearing 42, the second grooves 451 may also be formed on the outer circumferential surface 424 of the bearing 42. However, as in the example shown in FIG. 6, one of the grooves 351 and 451 are preferably formed on one of the inner circumferential surface 311 of the external gear 3 and the outer circumferential surface 424 of the bearing 42 and the other of the grooves 351 and 451 are preferably formed on the other of the inner circumferential surface 311 of the external gear 3 and the outer circumferential surface 424 of the bearing 42.

As explained above, in the embodiment explained above, the grooves 351 are provided along the rotation axis "a" on at least one of the inner circumferential surface 311 of the external gear 3 and the outer circumferential surface 424 of the bearing 42. As a result, even if the outer circumferential surface 424 of the bearing 42 rotates with respect to the external gear 3 according to the rotation of the wave generator 4, the grease GR between the inner circumferential surface 311 of the external gear 3 and the outer circumferential surface 424 of the bearing 42 can be easily retained by the grooves 351 provided along the rotation axis "a".

In the embodiment explained above, the cup-type external gear 3 is used. Instead, a hat-type external gear may be used. In a gear device including the hat-type external gear, the grooves explained with reference to FIGS. 5 and 6 above can also be applied. Consequently, the same effects as the effects explained above can be obtained.

The present disclosure is not limited to the embodiment explained above and can be realized in various forms without departing from the gist of the present disclosure. For example, the present disclosure can also be realized by the following aspects. The technical features in the embodiment corresponding to technical features in the aspects described below can be replaced or combined as appropriate in order to solve a part or all of the problems of the present disclosure or achieve a part or all of the effects of the present disclosure. Unless the technical features are explained as essential technical features in this specification, the technical features can be deleted as appropriate.

(1) According to a first aspect of the present disclosure, a gear device is provided. The gear device includes: an internal gear; a flexible external gear configured to partially mesh with the internal gear and relatively rotate around a rotation axis with respect to the internal gear; and a wave generator configured to come into contact with an inner circumferential surface of the external gear and move a meshing position of the internal gear and the external gear in a circumferential direction around the rotation axis. The wave generator includes: a cam having an elliptical outer circumferential surface; and a bearing disposed between the inner circumferential surface of the external gear and the outer circumferential surface of the cam. Grease is applied to the inner circumferential surface of the external gear. A groove is provided along the rotation axis on at least one of the inner circumferential surface of the external gear and an outer circumferential surface of the bearing.

With the gear device, even if the outer circumferential surface of the bearing rotates with respect to the external gear according to rotation of the wave generator, the grease between the inner circumferential surface of the external gear and the outer circumferential surface of the bearing can be easily retained by the groove provided along the rotation axis. As a result, the wave generator can be smoothly rotated.

(2) In the gear device, an angle formed by the groove and the rotation axis may be 5 degrees or less.

With the gear device, since the groove extends in a direction substantially parallel to the rotation axis, it is possible to easily guide the grease to between the external gear and the internal gear.

(3) In the gear device, two end portions of the external gear along the rotation axis may include an opened first end portion and a second end portion at an opposite side of the first end portion, the wave generator may be fit in the inner circumferential surface of the external gear in a position closer to the first end portion than the second end portion of the external gear, the groove may be provided on the inner circumferential surface of the external gear, and the groove may extend from the first end portion to the second end portion and may be provided across a portion in contact with the bearing of the wave generator on the inner circumferential surface of the external gear.

With the gear device, since the groove is provided across the portion in contact with the bearing of the wave generator on the inner circumferential surface of the external gear, it is possible to easily retain the grease between the external gear and the bearing of the wave generator. Since the groove extends from the opened first end portion toward the second end portion of the external gear, it is possible to easily guide the grease to between the external gear and the internal gear via the first end portion.

(4) In the gear device, the groove may be provided on the outer circumferential surface of the bearing, and the groove may be provided across both ends of the outer circumferential surface of the bearing along the rotation axis.

With the gear device, since the groove is provided across both the ends of the outer circumferential surface of the bearing of the wave generator, it is possible to easily retain the grease between the external gear and the bearing of the wave generator.

(5) In the gear device, a plurality of the grooves may be provided.

With the gear device, it is possible to easily retain a sufficient amount of the grease between the external gear and the bearing of the wave generator.

(6) In the gear device, another groove crossing the groove may be provided on at least one of the inner circumferential surface of the external gear and the outer circumferential surface of the bearing.

With the gear device, since the crossing grooves are provided, the grease can be retained by both of the crossing grooves.

(7) According to a second aspect of the present disclosure, a robot is provided. The robot includes: a first member configuring a base or an arm; a second member configuring an arm turnably provided with respect to the first member; and a gear device configured to transmit a driving force from one side to another side of the first member and the second member. The gear device includes: an internal gear; a flexible external gear configured to partially mesh with the internal gear and relatively rotate around a rotation axis with respect to the internal gear; and a wave generator configured to come into contact with an inner circumferential surface of the external gear and move a meshing position of the internal gear and the external gear in a circumferential direction around the rotation axis. The wave generator includes: a cam having an elliptical outer circumferential surface; and a bearing disposed between the inner circumferential surface of the external gear and the outer circumferential surface of the cam. Grease is applied to the inner circumferential surface of the external gear. A groove is provided along the rotation axis on at least one of the inner circumferential surface of the external gear and an outer circumferential surface of the bearing.

With the robot, even if the outer circumferential surface of the bearing rotates with respect to the external gear according to rotation of the wave generator, the grease between the inner circumferential surface of the external gear and the outer circumferential surface of the bearing can be easily retained by the groove provided along the rotation axis. As a result, the wave generator can be smoothly rotated.

What is claimed is:

1. A gear device comprising:
    an internal gear;
    a flexible external gear configured to partially mesh with the internal gear and relatively rotate around a rotation axis with respect to the internal gear; and
    a wave generator configured to come into contact with an inner circumferential surface of the external gear and move a meshing position of the internal gear and the external gear in a circumferential direction around the rotation axis, wherein
    the wave generator includes:
        a cam having an elliptical outer circumferential surface; and
        a bearing disposed between the inner circumferential surface of the external gear and the outer circumferential surface of the cam,
    grease is applied to the inner circumferential surface of the external gear,
    a groove is provided along the rotation axis on at least one of the inner circumferential surface of the external gear and an outer circumferential surface of the bearing,
    the grease contains a solid additive agent, and a width of the groove is the same as or more than a size of the solid additive agent, and
    a depth of the groove is smaller than the width of the groove.

2. The gear device according to claim 1, wherein an angle formed by the groove and the rotation axis is 5 degrees or less.

3. The gear device according to claim 1, wherein
    two end portions of the external gear along the rotation axis include an opened first end portion and a second end portion at an opposite side of the first end portion,
    the wave generator is fit in the inner circumferential surface of the external gear in a position closer to the first end portion than the second end portion of the external gear,
    the groove is provided on the inner circumferential surface of the external gear, and
    the groove extends from the first end portion toward the second end portion and is provided across a portion in contact with the bearing of the wave generator on the inner circumferential surface of the external gear.

4. The gear device according to claim 1, wherein
    the groove is provided on the outer circumferential surface of the bearing, and
    the groove is provided across both ends of the outer circumferential surface of the bearing along the rotation axis.

5. The gear device according to claim 1, wherein a plurality of the grooves are provided.

6. The gear device according to claim 1, wherein another groove crossing the groove is provided on at least one of the inner circumferential surface of the external gear and the outer circumferential surface of the bearing.

7. A robot comprising:
a first member configuring a base or an arm;
a second member configuring an arm turnably provided with respect to the first member; and
a gear device configured to transmit a driving force from one side to another side of the first member and the second member, wherein
the gear device includes:
- an internal gear;
- a flexible external gear configured to partially mesh with the internal gear and relatively rotate around a rotation axis with respect to the internal gear; and
- a wave generator configured to come into contact with an inner circumferential surface of the external gear and move a meshing position of the internal gear and the external gear in a circumferential direction around the rotation axis, the wave generator includes:
- a cam having an elliptical outer circumferential surface; and
- a bearing disposed between the inner circumferential surface of the external gear and the outer circumferential surface of the cam, grease is applied to the inner circumferential surface of the external gear,
a groove is provided along the rotation axis on at least one of the inner circumferential surface of the external gear and an outer circumferential surface of the bearing,
the grease contains a solid additive agent, and a width of the groove is the same as or more than a size of the solid additive agent, and
a depth of the groove is smaller than the width of the groove.

* * * * *